United States Patent [19]

Hilgendorff et al.

[11] Patent Number: 4,650,574
[45] Date of Patent: Mar. 17, 1987

[54] APPARATUS FOR THE SEPARATION OF SOLUTIONS BY PERVAPORATION

[75] Inventors: Walter Hilgendorff, Tespe; Axel Wenzlaff, Escheburg; Karl Böddeker, Breitenfelde; Gerhard Kahn, Geesthacht; Gunter Lührs, Bardowick, all of Fed. Rep. of Germany

[73] Assignee: GSK Forschungszentrum Geesthacht GmbH, Geesthacht, Fed. Rep. of Germany

[21] Appl. No.: 700,537

[22] Filed: Feb. 11, 1985

Related U.S. Application Data

[63] Continuation-in-part of Ser. No. 578,620, Feb. 9, 1984, abandoned.

[30] Foreign Application Priority Data

Feb. 12, 1983 [DE] Fed. Rep. of Germany ....... 3304956

[51] Int. Cl.⁴ ............................................. B01D 13/00
[52] U.S. Cl. ..................................... 210/180; 55/158; 210/321.1; 210/640
[58] Field of Search ................ 210/640, 321.1, 321.2, 210/180; 55/158

[56] References Cited

U.S. PATENT DOCUMENTS 3,398,091  8/1968  Greatorex ........................... 210/640
3,520,803  7/1970  Iaconelli ............................. 210/640
3,695,444 10/1972  Iaconelli ........................... 210/321.2
4,228,014 10/1980  Timm et al. ........................ 210/347

Primary Examiner—Richard V. Fisher
Assistant Examiner—W. Gary Jones

[57] ABSTRACT

An apparatus for the separation of solutions by pervaporation includes a raw solution chamber through which a raw solution is conducted from which a part is to be separated, a permeation chamber disposed adjacent the raw solution chamber but separated therefrom by a membrane which permits evaporation therethrough of part of the solution into the permeation chamber from which the vapors are removed, a heating structure arranged adjacent the raw solution chamber in direct contact with the raw solution therein for replenishing to the solution the heat consumed by pervaporation of part of the solution through the membrane. The raw solution chambers have closely spaced solution supply and discharge openings along opposite walls to provide laminar flow therethrough in one direction and the pervaporation chambers have discharge openings closely spaced along opposite side walls oriented normal to the orientation of the raw solution supply and discharge openings so as to rapidly remove from the pervaporation chamber any pervaporate and to remove it in a direction normal to the flow direction of the raw solution through the raw solution chamber.

8 Claims, 5 Drawing Figures

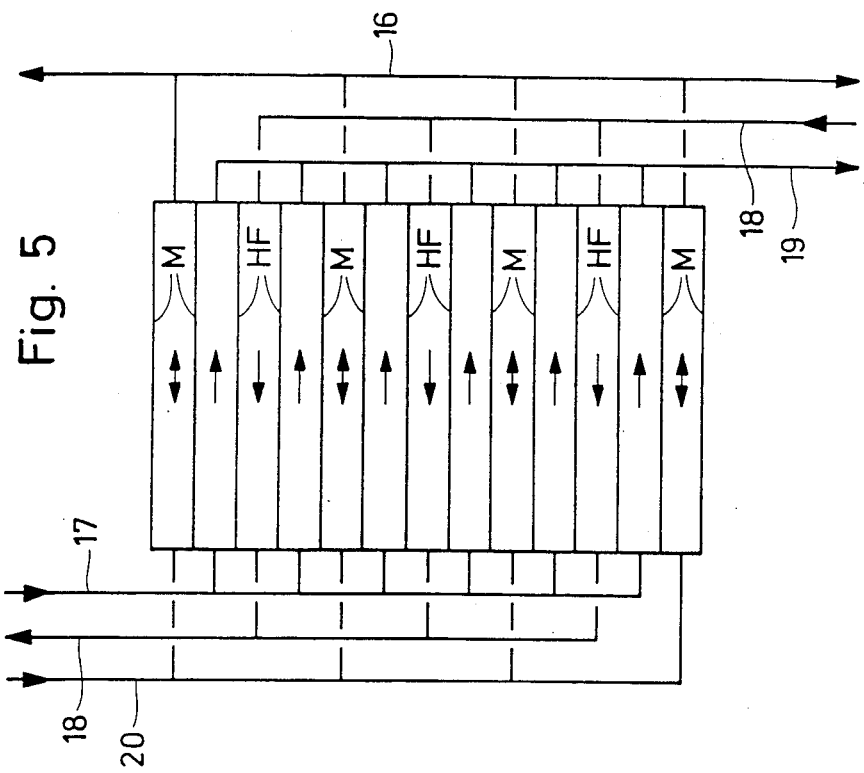
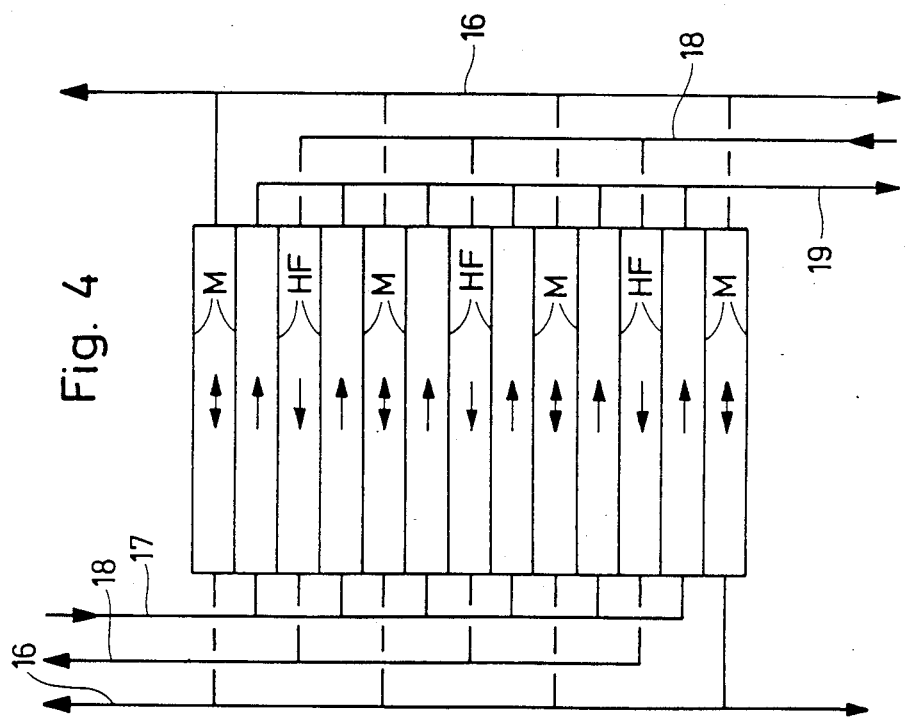

APPARATUS FOR THE SEPARATION OF SOLUTIONS BY PERVAPORATION

The present application is a continuation-in-part application of U.S. application Ser. No. 578,620, filed Feb. 9, 1984, now abandoned.

FIELD OF THE INVENTION

The invention relates to an apparatus for the separation of solutions by pervaporation with at least a raw solution chamber for the reception of a solution and a permeation chamber separated from the raw solution chamber by a vapor permeable membrane.

BACKGROUND OF THE INVENTION

Pervaporation is a technique of separation of liquid mixtures. The mixtures to be separated are conducted onto one side of membranes which are essentially impervious to liquids but will permit passage of vapors in a controlled manner. The other sides of the membranes are usually exposed to a vacuum and the vapors passing through the membranes are removed and condensed in a condenser. It is also possible to remove the vapors by means of a carrier gas and separate them from the carrier gas by condensation in the condenser. The membranes usually consist of plastic and permit passage of vapors at a rate which is larger the thinner the membranes are. The membranes, therefore, are very thin, flexible foils which are suitably mounted in special apparatus (pervaporators).

Liquid mixtures are generally separated by distillation. In numerous mixtures such as water-ethanol, chloroform-hexane, ethanol-cyclohexane, butanol-heptane, water-isopropanol, water-tetrahydrofuran, water-dioxane, methanol-acetone, methanol-benzene, ethanol-ethylacetate and methanol-methylacetate, one arrives at a concentration limit at which the mixture vaporizes azeotropically, that is, at which the mixture can no longer be separated. This problem can be alleviated or overcome by the addition of third compounds wherein the separation steps may be continued by extractive distillation, however, only with substantial efforts.

Pervaporation offers an alternative solution. In such a process one of the two components of a mixture is preferentially adsorbed by a membrane. A membrane is exposed at one side to a stream of the mixture and a vacuum is applied to the membrane at the opposite side so that the liquid compound adsorbed at one side vaporizes and passes through the membrane and is removed as vapor from its other side, thereby providing room for the adsorption by the membrane of additional liquid. Selection of suitable membranes permits the separation of components of a mixture, also of azeotropic mixtures.

Since this technique is relatively new, apparatus used presently are usually those developed for reverse osmosis processes. Reverse osmosis is a separation process based on different physical conditions such as high pressure differentials across the membrane, liquid states at both sides of, and during the flow through, the membrane, and no heat consumption upon permeation through the membrane.

For the utilization of foil-type membranes, apparatus with spirally wound membranes may be utilized. Supply chambers and permeation chambers are formed in this case by grid structures disposed between the membranes and consisting of plastic materials, stretch metal screens and similar structures which have a mesh structure through which the liquids can flow. The membranes are sealed in by cementing and disposed in tubular containers.

Another alternative arrangement utilizes frame-type modules which have flat membranes mounted, under tension, in the frame. The frame has transmission passages incorporated therein for conducting liquid to an adjacent chamber. Sealing between frames is obtained by O-rings or profiled seal rings. The design of the frame modules is such that there is a narrow chamber for the admission of the liquid mixture above the membrane. With its lower side the membrane is disposed on a grid structure with small openings or a ceramic support whose porosity permits removal of the permeates in collecting conduits (DE AS-28 02 780).

Such structures are assembled side-by-side with top and bottom end plates which are contained by threaded bolts so as to compress and seal the frame structures therebetween.

In accordance with the purpose of the modules, such arrangements are highly pressure resistant; they are built with large expenditures of materials. The housings, threaded bolts, flange members and pipe connectors are designed to withstand pressures of 40 to 100 bar—depending on the manufacturer. A reduction of the qualities of the materials and strength of the components to accommodate only the requirements for pervaporation of 1 bar pressure differential and vacuum operation, however, is not possible because the types of seals, and the duct structure for guiding the liquid by flow passages formed in profiled rubber sealed between adjacent plates, will not permit a substantial reduction of the thickness of the materials without disturbing the flow geometry.

The method of pervaporation, by its principle, also results in high heat consumption because of the vaporizing step at the membrane which may cool the solutions to such a degree that their flowing capability is greatly reduced whereby the pervaporation efficiency decreases exponentially.

The addition of heat as compensation for the heat consumption is necessary to prevent cooling of the mixture in the modules. Generally, the solution is reheated outside the module and supplied to a subsequent module. The length of a module, therefore, must depend on the acceptable or tolerated rate of cool-down of the mixture to be separated. However, since, on one hand, the degree of cooling depends directly on the membrane efficiency but, on the other hand, the pervaporation efficiency experiences rapid degradation with falling temperatures, acceptable conditions are achieved only with small modules.

It is obvious, however, that a compact arrangement of relatively large membranes within a relatively small number of modules which are relatively large in size is better and less expensive than the provision of the same membrane surface area in a large number of relatively small modules with heat exchangers arranged between consecutive modules especially since the capital expenditures for such apparatus are determined to a large extent by the end plate structures of each module (two for each module) provided with inlet and outlet nozzles.

With the large modules of the prior art, a small temperature differential between inlet and outlet flow may be achieved by pumping the solution through the modules at high flow rates, that is, at several times the speed necessary for the removal of the desired amount of the mixture component. Then, $\Delta t$ may be reduced and the mixture can be reheated in a subsequent heat exchanger to make up for the heat taken from the mixture for the evaporation of part thereof through the membrane.

This, however, would require recirculation of the mixture whereby, for example, 90% of the mixture would be recirculated in each module and 10% would be passed on to the next module where it would again be subjected to recirculation with pervaporation of only a small fraction of the amount of mixture that needs to be circulated. Such an arrangement would require less capital investment than an arrangement with a large number of small modules but it results in relatively high operating costs since the circulating pumps, which are pumping ten times the amount of liquid at substantially increased speed and flow resistance, consume large amounts of energy.

U.S. Pat. Nos. 3,398,081; 3,520,803 and 3,695,444, all assigned to Ionics, Incorporated, Watertown, Mass., disclose pervaporation apparatus with a three-chamber module wherein heat is transmitted to the solution by means of integral chambers through which a hot liquid is conducted. In order to achieve good heat transfer, the hot liquid is conducted through each chamber in a tortuous path formed by divider walls, and the solution is conducted through the adjacent chambers through congruent tortuous paths which also have 180° turns and consequently cause substantial turbulence in the solution conducted therethrough.

A major problem encountered in connection with the presently utilized modules is found in a relatively high vapor flow resistance at the vapor side of the modules. Caused by incomplete withdrawal of the mixture components passed through the membranes, an equilibrium status is developed which reduces or even destroys separation performance of a module. Considering the presently utilized modules it is noted that it is impossible to remove the amount of vapors at the secondary side of the membrane at a typical operating pressure of 5 m bar. With the given modules' designs at pervaporation rates of 25 kg/m², the vapor velocities would—even considering the most favorable discharge designs—reach velocities of about 100 m/s simply which would result in high flow resistances in the modules' secondary side relatively small flow passages.

If, however, not properly removed from the modules' secondary side, the vapors may condense on the membranes and form membrane-wetting condensate films which initiate an osmotic process that causes an exchange of concentration through the membranes so that, on balance, there is no separation of the mixture admitted to a module. Even if most of the vapors can be removed through the discharge passages, the narrow draining passage arrangement results in insufficient vapor pressure relief which leads to capillary condensation in accordance with the principles of capillarity and surface tension.

Incomplete removal of the vapors therefore decreases the membrane performance with regard to the amount of permeate and separation quality. The prior art apparatus have an additional performance-reducing property which is caused by the flow pattern of the fluids in the various chambers of the apparatus. To facilitate explanation of this phenomenon, a typical pervaporation process in a particular module is analyzed: as far as permeation quality and permeation quantity is concerned, a pervaporation apparatus for the separation of a solution AB, which is to produce, for example, large amounts of the component A with only a small content of the component B, is highly dependent on the composition of the solution adjacent the membrane.

The following example makes this quite clear: A mixture of ethyl alcohol and water is to be separated as completely as possible by pervaporation through a cellulose triacetate membrane. Since the membrane preferably permits the passage of water accompanied only by a small amount of ethyl alcohol, the mixture may be so treated that, after extended processing, there is only practically pure ethyl alcohol at the admission side of the membrane after practically all the water has passed through the membrane and was removed as permeate. The permeate though is mixed with a small amount of ethyl alcohol since, practically, no absolutely perfect separation is possible.

The following table shows that the separation quality of the membranes depends, indeed depends greatly, on the composition of the solution directly adjacent the membrane.

| Composition of the Raw Solution Adjacent the Membrane | | Composition of the Corresponding Permeates | |
| --- | --- | --- | --- |
| % Ethyl Alcohol | % Water | % Ethyl Alcohol | % Water |
| 20 | 80 | 2 | 98 |
| 50 | 50 | 10 | 90 |
| 80 | 20 | 30 | 70 |
| 96 | 4 | 60 | 40 |

The given values are typical and may be supplemented by numerous similar examples available from the literature.

Similarly, the quantity of permeate obtainable from a predetermined membrane area within a given time also is greatly dependent on the mixture ratio of the components to be separated. By way of a series of tests with solutions of different concentrations, the flow maxima and minima may be determined empirically.

Consequently, raw solution and permeate are in an equilibrium relationship which means that a change of the raw solution composition will automatically result in a corresponding change of the permeate composition until equilibrium is achieved. Also, if in a system in equilibrium, the equilibrium would be disturbed, for example, by the addition of water to the permeate, the permeate composition of subsequently produced permeates would contain less water until equilibrium is again achieved. Using the numbers in the given example the situation at the membranes would be as follows.

A mixture of 80% ethyl alcohol and 20% water reaches the membrane at the start at one side thereof. The corresponding permeate consists of 30% ethyl alcohol and 70% water. The flow of the mixture along the membrane at said one side loses water content, that is, the ethyl alcohol becomes more concentrated. As a result, somewhat downstream the mixture at said one side will consist, for example, of 90% ethyl alcohol and 10% water which will result in a permeate of 45% ethyl alcohol and 55% water.

It is clearly apparent that the amount of ethyl alcohol in the permeate is increasing at an undesirable rate, that is, water removal from the solution becomes less efficient. If, as in the prior art modules, the permeates are removed at one end of the permeate chamber, which end furthermore has only one or a small number of discharge openings, the permeates are not rapidly removed but violently and totally mixed, a permeate of relatively high concentration remains adjacent the membrane surface thereby reducing the efficiency and the separation capacity of the apparatus. This is especially true for the areas of the membrane adjacent the discharge openings where the mixtures are more concentrated anyway. The turbulent mixing of the permeates is especially disadvantageous when the flow direction of the raw mixture and that of the permeate at opposite sides of a membrane are the same. In that case —using the given example—permeates with a high water content are produced at the solution chamber inlet, which permeates, however, are conducted past permeates which are produced downstream and have a greater ethyl alcohol content, with which they mix and produce in the permeate a water concentration higher than that corresponding to the raw solution at the opposite side of the membrane. This, of course, results in a reduction of the separation quality in the affected areas of the membrane since the water content of the permeates may now be higher than in accordance with the equilibrium conditions.

It is, therefore, the object of the present invention to provide a pervaporation apparatus which can fulfill the requirements necessary for the pervaporation technique to succeed:

1. The membrane should have a large surface based on chamber volume.
2. There should be a perfect seal between liquid and vapor chambers.
3. The liquid supply stream should flow evenly across the membrane surface.
4. The sensitive membrane should be adequately supported.
5. Removal of vapors should not be obstructed by the membrane support means.
6. The flow resistance on the secondary side of the membrane should be low so that a sufficiently low pressure can be maintained even during generation of large vapor volumes.
7. The apparatus should have means which make it possible to replace the heat consumed by the pervaporation through the membranes.

SUMMARY OF THE INVENTION

In an apparatus for the separation of solution by pervaporation, a raw solution chamber through which a raw solution is conducted is disposed adjacent a permeation chamber but separated therefrom a membrane which permits pervaporation of part of the solution into the permeation chamber from which the vapors are removed. The heat consumed by the vaporization of part of the solution is replenished by a heating structure disposed adjacent to, and forming a side wall of, the raw solution chamber so that the raw solution chamber is maintained at the proper temperature for efficient performance of the pervaporation process.

The efficiency is substantially increased by providing a plurality of raw solution supply and discharge openings at opposite raw solution chamber side walls so as to generate a laminar raw solution flow through the raw solution chamber and by providing a plurality of closely spaced blowdown openings along opposite side walls of the pervaporation chamber in an orientation essentially at 90° with respect to the orientation of the raw solution supply and discharge openings for rapid and efficient removal of the pervaporate from the pervaporation chamber in a direction normal to the flow of raw solution through the raw solution chamber.

This arrangement avoids mixing of pervaporate of different concentrations, thereby maintaining a concentration relation between raw solution and pervaporate at the optimum value for efficient and effective separation.

Also, with the apparatus according to the invention, a heating structure is incorporated in the primary module chambers so that the raw mixture in the primary chambers may be maintained at optimum temperatures without the need for large circulation flows, thereby providing large vapor flows, which can be accommodated by the vapor passages on the secondary side of the module being large in number and short. Since discharge openings are provided at both ends, the maximum length of the vapor chamber travel distance is no more than half the width of a membrane.

Selection of the dimensions of the pervaporator, the number of heating elements in the pervaporator, the arrangement of the modules, that is, in parallel, in series, or combined, the location of the vapor discharge nozzles and the materials used in construction permit a wide variety of applications.

The heating elements are preferably integrated into the pervaporator structure.

The arrangement of passages is so as to cause only small pressure losses.

The plates are preferably of thin design resulting in a dense mounting arrangement.

Also the chamber functions may be switched and, preferably, there are provided nozzles for a scavenging or carrier gas.

SHORT DESCRIPTION OF THE DRAWINGS

FIG. 1 is a partial exploded view of a pervaporator which utilizes vacuum at its secondary side; and FIGS. 2 to 5 show various flow circuit arrangements for pervaporators.

DESCRIPTION OF PREFERRED EMBODIMENTS

Figure 1:
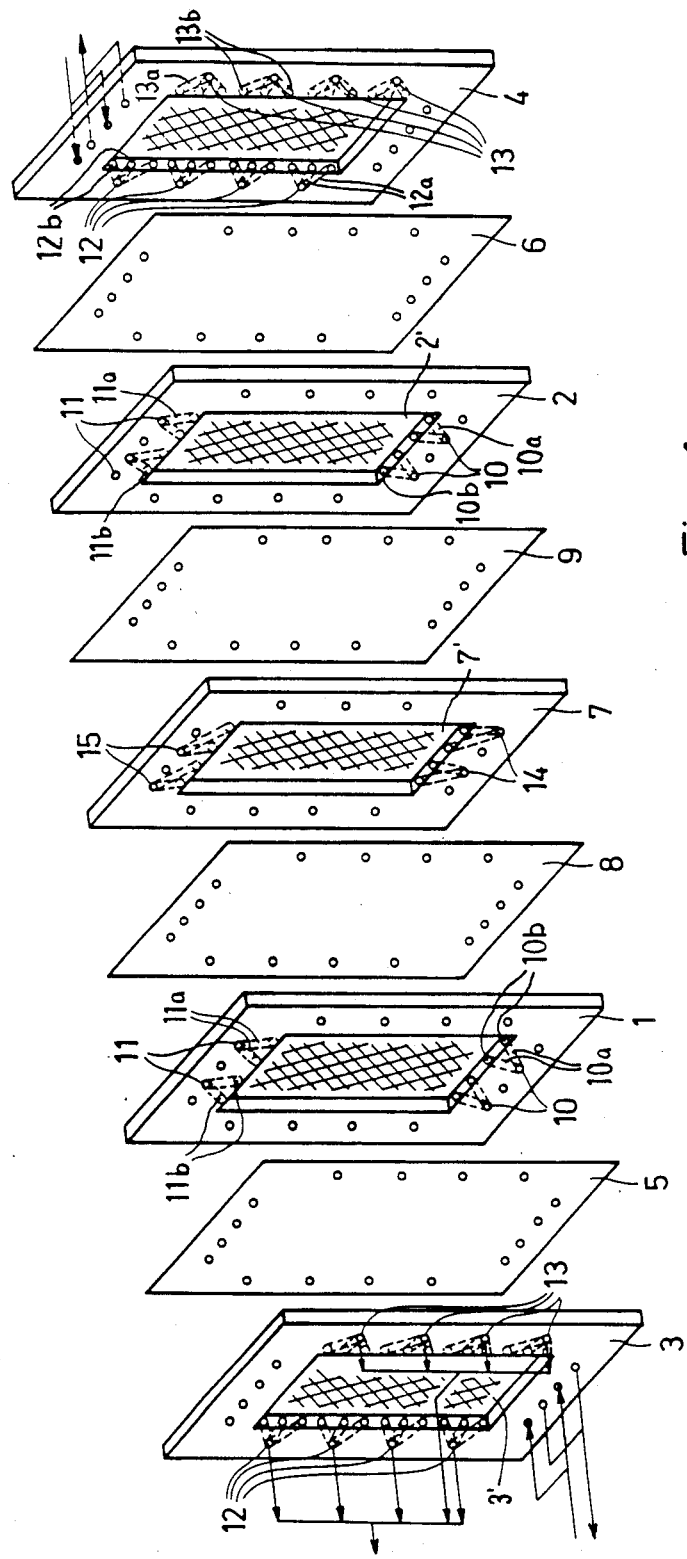

FIG. 1 shows a part of a pervaporator which is operated without scavenging gas, that is, one which has a vacuum applied to its secondary (permeation) chambers. As shown, the pervaporator is composed of a stack of units of raw solution (primary) chamber frames 1 and 2, pervaporation chamber frames 3 and 4, membranes 5 and 6 which are arranged between the frames 1 and 3, and 2 and 4 and heating chamber frame 7 with heating panels 8 and 9 disposed at opposite sides thereof. All parts have the same outer dimensions. They are preferably oblong but they may be of round, oval, square or polygonal shape.

The raw solution chambers 1', 2', the pervaporation chambers 3', 4' and the heating chamber 7' all are defined within the respective frames 1, 2; 3, 4 and 7, which frames have various passages which serve to supply raw solution, to remove vapor or admit scavenging gas or to apply a vacuum and to supply a heating medium by way of the respective passages 10 to 15. The membranes 5 and 6 are arranged between raw solution and pervaporation chamber frames 1, 3 and 2, 4. The raw solution is supplied to the chambers 1', 2', through the supply passages 10 and inlet branch passages 10a which provide for a plurality of inlet openings 10b evenly spaced along one (the bottom) side of the frame 1. The solution is removed from the chambers 1', 2' through discharge passages 11 which are in communication by means of a plurality of outlet branch passages 11a with outlet openings 11b evenly spaced along the opposite side (top side as shown in FIG. 1) of the frame 11 so that the raw solution is conducted in an almost laminar flow from the bottom to the top through the raw solution chambers in frames 1 and 2 and is subjected to pervaporation through the membranes 5 and 6. The pervaporation chamber frames 3 and 4 have vapor blowdown passages 12, 13 arranged at opposite sides of the frame, which blowdown passages 12, 13 are in communication with the pervaporation chambers 3', 4' by means of a plurality of branch passages 12a, 13a leading to blowdown openings 12b, 13b evenly spaced along opposite sides of the pervaporation chamber frames 3, 4 and oriented at a 90° angle with respect to the orientation of the solution inlet and outlet openings 10b and 11b. If the frames are oblong, the blowdown openings are arranged along the longer sides of the frame so as to accommodate a larger number of blowdown openings and to minimize the distance from the center of the pervaporation chambers to the blowdown openings for rapid and efficient removal of the pervaporate from the pervaporation chambers.

The process of pervaporation consumes heat which would normally result in a linear cooling of the solution from the bottom to its exit at the top. Cooling down of the solution, however, is counterbalanced by a heating structure formed by the heating panels 8 and 9 which are disposed adjacent the solution chamber frames 1 and 2 at opposite sides of the heating chamber frame 7. The arrangement of the solution chamber frames 1 and 2 is mirror-like with respect to the heating chamber frame for economical reasons, that is, in order to be able to heat the solution in two raw solution chambers with the aid of a single heating chamber structure. The raw solution in both raw solution chambers is therefore in heat exchange contact with the heating fluid (water) in the heating chamber 7' of the heating frame 7 through which heating chamber 7' the heating fluid is conducted in counter flow relation to the flow direction of the raw solution through the raw solution chambers 1' and 2'. The heating fluid transmits heat through the interposed heating panels 8, 9 to the raw solution and provides for an essentially even temperature distribution of the raw solution in the raw solution chambers 1' and 2'.

Instead of a heating chamber frame 7 with heating chamber 7' and heating panels 8 and 9, there may be provided a single electric heating plate adapted to heat the raw solution. If the generation of vapors is relatively large, the permeation chambers 3' and 4' in the permeation chamber frames 3 and 4 may be correspondingly dimensioned (in width) without a chamber in the operation principle of the pervaporator.

Figure 3:
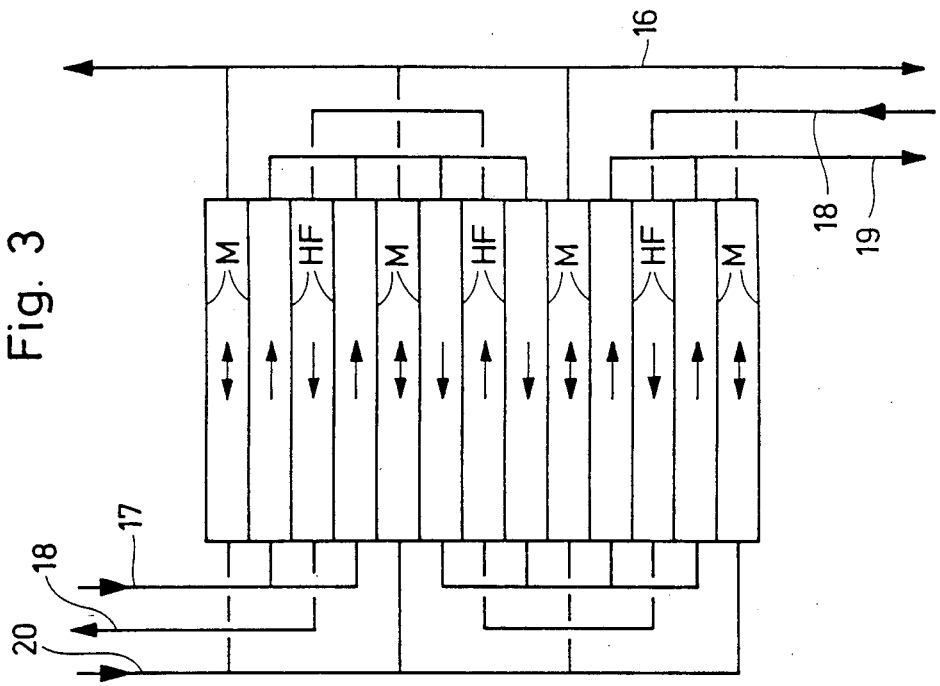
Figure 2:
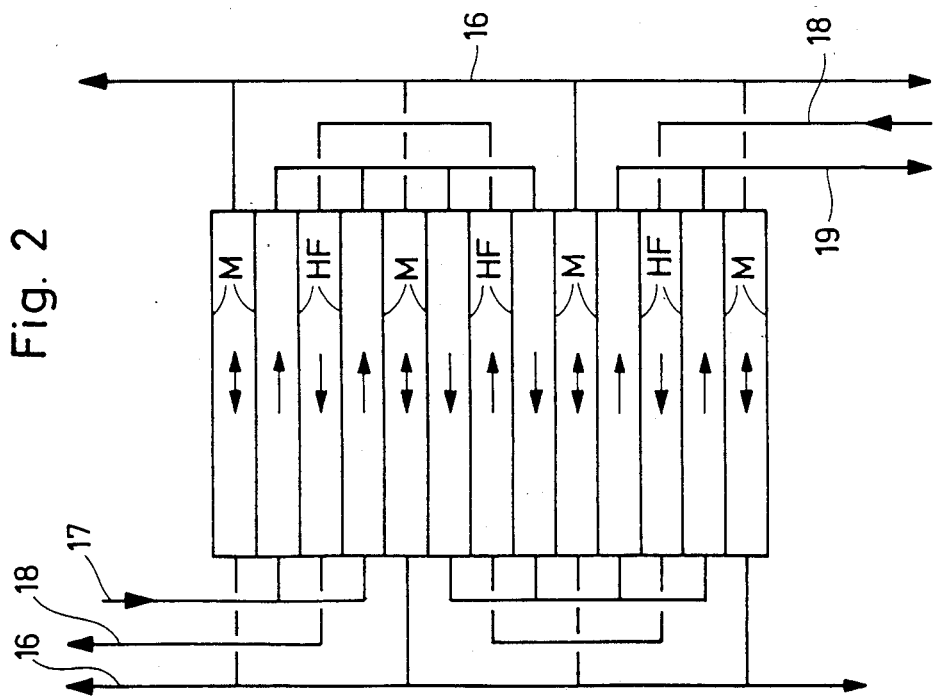

FIGS. 2-5 show various flow circuit arrangements for the vapors 16, the raw solution 17, the heating fluid 18 and the scavenging gas 20 as well as the concentrate 19 in connection with pervaporation modules wherein FIGS. 2 and 3 show series arrangements without and with scavenging gas and FIGS. 4 and 5 show parallel arrangements without and with scavenging gas.

The flow directions of the various fluids between the membranes M and the heating panels HF are indicated by the arrows. Other circuit arrangements are possible depending on the applications, for example, laboratory or industrial applications.

In summary, the invention provides an economical concept of apparatus for the utilization of the pervaporation principle which avoids the disadvantages of the apparatus as presently used and previously described.

In particular, the apparatus according to the invention achieves the following:

Supply of heat of evaporation through module-integrated heat exchange;

Properly dimensioned permeation chambers with short vapor discharge passages;

Capability for series or parallel or combined flow arrangements for the separation chambers with apparatus-internal passages;

Complete and even coverage of the membranes even at low pressure differentials;

High stacking density;

Capability of operation without vacuum by controlled passage through the permeation chambers of inert scavenging gas for carrying out the permeation vapors.

The structure of the pervaporator in the stacked plate concept is characterized essentially by:

switchover of chamber functions, that is, raw solution may be introduced into the permeation chamber so that the raw solution chamber becomes the permeation chamber for the removal of high concentration liquids on the membrane surfaces;

versatile application of the pervaporator beginning with laboratory equipment to industrial applications;

the direct supply of energy in the pervaporator which results in continuously high solution and membrane temperatures for highest pervaporation flows and maximum selectivity;

short vapor passages with large flow passage cross-sections in the permeation chambers which result in rapid removal of the vapors from the permeation chambers and a low concentration at the vapor side of the membranes; and reverse application of raw solution to the membranes with vapor removal from the raw solution chamber permitting removal of high concentrations at the primary and secondary sides of the membranes.

We claim:

1. Apparatus for the separation of solutions by pervaporation, said apparatus comprising means defining at least one raw solution chamber for the reception of raw solution, means defining a pervaporation chamber disposed adjacent said raw solution chamber, a membrane disposed between said raw solution chamber and said pervaporation chamber so as to permit evaporation of part of said solution through said membrane into said pervaporation chamber from which the vapors are removed, and heating means associated with said raw solution chamber so as to transmit heat to the raw solution therein for replenishing in said raw solution the heat consumed by pervaporation of part of said solution through said membrane into said pervaporation chamber, said raw solution chamber having circumferential side walls with one of two oppositely disposed side walls having means defining a plurality of closely spaced raw solution supply openings and the other of said two oppositely disposed side walls having means defining a plurality of closely spaced raw solution discharge openings representing means for generating within said raw solution chamber an essentially laminar flow of raw solution in a direction from said supply openings to said discharge openings and said pervaporation chamber having circumferential side walls with two opposite side walls oriented essentially at an angle of 90° with respect to the orientation of said oppositely disposed raw solution chamber side walls and said two pervaporation chamber side walls having means defining a plurality of closely spaced blowdown openings for rapid and efficient removal of the pervaporate from the pervaporation chamber in a direction normal to the flow direction of the raw solution through the raw solution chamber and for avoiding mixing of pervaporate of different concentrations.

2. An apparatus as claimed in claim 1, wherein said pervaporation chamber is oblong and said plurality of blowdown openings are arranged along the two longer sides of the pervaporation chamber so as to minimize the distance of the blowdown openings from the center of the pervaporation chamber.

3. An apparatus as claimed in claim 1, wherein said raw solution and said pervaporation chambers are defined by circumferential frames and wherein said raw solution supply openings and said raw solution discharge openings are the ends of the inlet and, respectively, outlet branch passages extending through the raw solution chamber frame and said pervaporation chamber blowdown openings are the ends of branch passages extending through the pervaporation chamber frame, said branch passages of each frame section being in communication with the respective raw solution supply and discharge ducts and, respectively, pervaporate blowdown ducts.

4. An apparatus according to claim 1, wherein said heating means are heating chambers arranged, and sized to fit, adjacent said raw solution chambers but separated therefrom by heat transfer panels, whereby said heating chambers may receive a heating fluid passing therethrough in contact with said heat transfer panels thereby to transmit heat through said heat transfer panels directly to the solution in said raw solution chambers.

5. An apparatus according to claim 4, wherein said heating chamber is formed between two raw solution chambers so as to be adapted to provide heat to the raw solution in the two adjacent raw solution chambers from which it is separated by two spaced heat transfer panels.

6. An apparatus according to claim 1, wherein said heating means are heating plates arranged and sized to fit adjacent said raw solution chambers so as to be in direct contact with the raw solution therein for transmitting heat from said heating plates to the raw solution in said raw solution chamber.

7. An apparatus according to claim 6, wherein each of said heating plates is disposed between two adjacent raw solution chambers so as to provide heat to the raw solution at the same time in the two adjacent raw solution chambers which are separated by said heating plates.

8. An apparatus according to claim 1, wherein said permeation chamber is larger, in volume, than said raw solution chamber and has inlet and outlet passages for supplying a scavenging gas thereto and for applying a vacuum to remove the vapors therefrom passing through said membrane into said permeation chamber.

* * * * *